Feb. 10, 1970   T. G. SMOLKA ET AL   3,494,220
LOCKING ARRANGEMENT
Filed May 24, 1968   4 Sheets-Sheet 1

Feb. 10, 1970     T. G. SMOLKA ET AL     3,494,220

LOCKING ARRANGEMENT

Filed May 24, 1968                                        4 Sheets-Sheet 2

Inventors:
Thomas Gordon Smolka
Johann Zelinka
By Michael S. Strike
Attorney

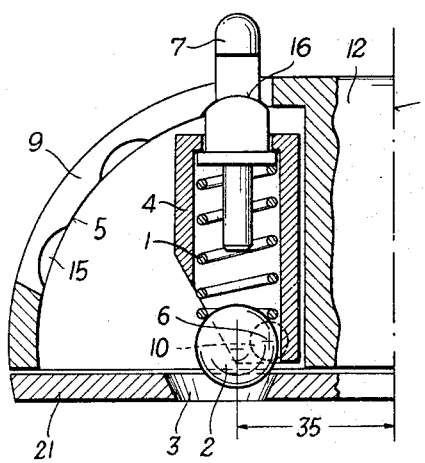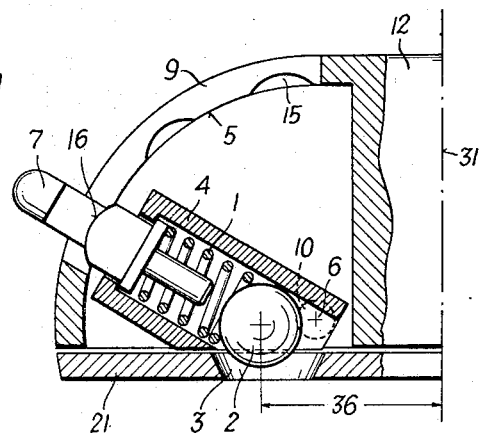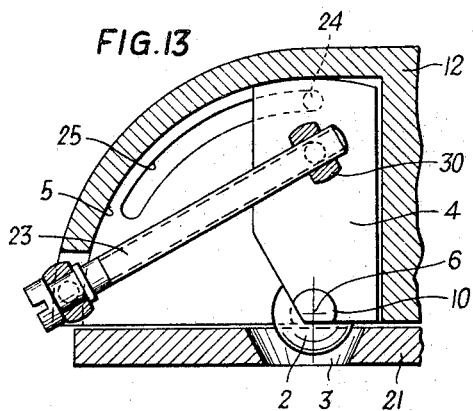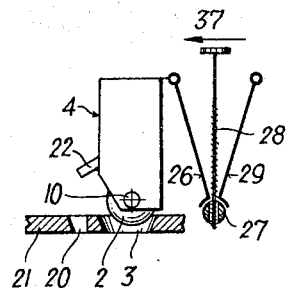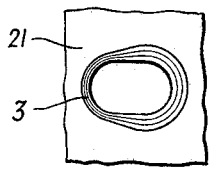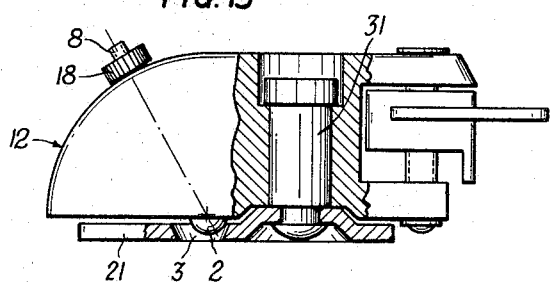

3,494,220
LOCKING ARRANGEMENT
Thomas G. Smolka and Johann Zelinka, Vienna, Austria, assignors to Wiener Metallwarenfabrik Smolka & Co., Vienna, Austria
Filed May 24, 1968, Ser. No. 731,873
Claims priority, application Austria, May 30, 1967, A 5,035/67
Int. Cl. G05g 5/06
U.S. Cl. 74—527                                 22 Claims

ABSTRACT OF THE DISCLOSURE

A locking arrangement for use in ski bindings comprising two structural members which are movable relative to one another of which one is provided with a seat, a detent arrangement which includes a retaining member which is arranged to enter and leave the seat and movable in a first direction for so doing, and biasing means acting upon the retaining member in a second direction to urge it into the seat. A carrier sleeve surrounds the detent arrangement and is guided by the other member movable between a plurality of positions to thereby change the angle which is enclosed between the first and second directions so as to vary the extent to which the retaining member must move in the second direction in order to be able to move in the first direction by a distance sufficient for the retaining member to leave the seat.

BACKGROUND OF THE INVENTION

The present invention relates to locking arrangements in general, and more particularly to locking arrangements which find a field of application in conjunction with safety ski bindings.

Safety ski bindings are known which will release the ski boot in case the skier falls, so that the ski boot becomes disconnected from the ski to thereby avoid injury to the leg of the skier. Such safety ski bindings have proved to be very effective in reducing the incidents of injuries resulting from falls. However, they are not yet entirely satisfactory in their operation, particularly because the release force required to effect release of the ski from the boot, or vice versa, cannot be readily adjusted at the will of the skier.

It is therefore an object of the invention to overcome this and other problems still found in constructions of the type hereunder discussion.

SUMMARY OF THE INVENTION

In accordance with one feature of our invention we provide a construction of the type here in question which includes a structural member provided with a seat, and detent means comprising a retaining member which is arranged to enter and leave the seat and which is movable in a first direction so as to leave the seat, and biasing means which acts upon the retaining member in a second direction to thereby urge it to enter into the seat. Carrier means is provided for the detent means and is movable between a plurality of positions whereby to change the angle which is enclosed between the first and second directions to thereby vary the extent to which the retaining member must move is the aforementioned second direction in order to be able to move in the first direction by a distance sufficient for the retaining member to leave the seat in the structural member.

In accordance with another feature of our invention the carrier means advantageously consists of a sleeve-shape member which is movable in an arcuate path and can be arrested in a plurality of positions along the arcuate path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 11 is an additional embodiment of the invention in a first position of adjustment;

FIG. 12 is a view similar to FIG. 11 but illustrating the same embodiment in a different position of adjustment;

FIG. 13 is a view somewhat similar to FIG. 11 but illustrating yet a further embodiment of the invention;

FIG. 14 is a schematic detailed view illustrating another embodiment of the invention;

FIG. 15 is a front boot-engaging member in a ski binding;

FIG. 16 is a detailed view of FIG. 15;

DESCRIPTION OF THE PREFERRED EMBODIMENTS

Figure 1:
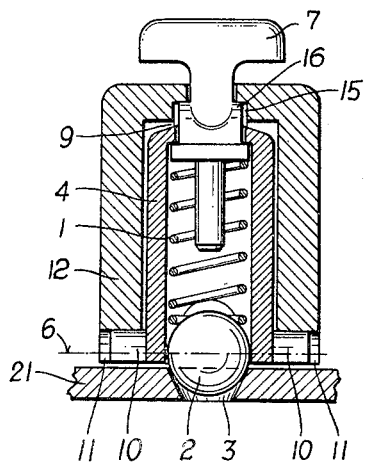
FIG. 1 is a first sectional elevation of a first embodiment of the invention.

Discussing now the drawing in detail, and firstly FIGS. 1–4 thereof, it will be seen that there are two structural members 12 and 21 illustrated which, while normally arrested against relative movement, are to be relatively movable when released. Specifically, the member 12 is to be pivotable relative to the member 21 about the pivot axis 31 (FIG. 2) while the member 21 retains its position. The member 12 is provided, as illustrated particularly in FIG. 1, with recesses 11 in which lateral projections 10 of a sleeve member 4 are received, thus mounting the sleeve member 4 pivotably. The structural member 21 is provided with a recess or seat 3 whose outline is most clearly shown in FIG. 3, and a retaining member which is here illustrated as a ball 2 is arranged to move into and out of the seat 3. It is urged into the seat 3 by biasing means here illustrated as a helical spring 1 which in the embodiment of FIGS. 1–4 bears upon the ball 2 as well as an actuating portion 7. The ball 2 prevents movement of the member 12 with reference to the member 21 about the axis 31 while it is received in the seat 3. It is, however, movable out of the seat 3 against the biasing action of the spring 1, namely in a first direction where it is urged into the seat by the spring 1 in a second direction. Projections are provided on the actuating portion 7, and are identified with reference numerals 16, and these projections are engagable in recesses 15 of a wall portion 5 which defines an arcuate path for movement for the sleeve member 4. This arcuate path is concentric with the tilting axis 6 of the sleeve member 4 which tilting axis in the embodiment of FIGS. 1–4 intersects the ball 2 centrally. The wall portion 5 is provided with a slot 9 through which the actuating portions 7 extends outwardly in part to facilitate grasping of the portion 7 and moving of the sleeve member 4 therewith to various positions of adjustment.

It will be appreciated that if the portion 7 is depressed in the direction toward the wall portion 5, the projections 16 become disengaged from the respective recess 5 in which they are lodged, thus making it possible to move the portion 7 and thereby tilt the sleeve member 4 in the direction of the arcuate path defined by the wall portion 5 about the tilting or pivot axis 6. When pressure in downward direction on the portion 7 is released, the biasing spring 1 will restore the projections 16 for engagement in whichever one of the recesses 15 with which they register at the time, thus arresting the sleeve member 4 in the selected position. An end position thus selected is for example shown in FIG. 4.

Figure 2:
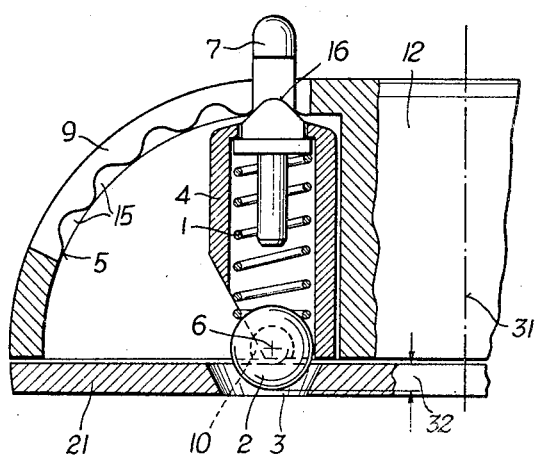
FIG. 2 is a second sectional elevation of the embodiment of FIG. 1, as seen from the right-hand side of FIG. 1.
Figure 3:
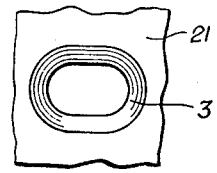
FIG. 3 is a top-plan view of a component of the embodiment of FIGS. 1 and 2.
Figure 4:
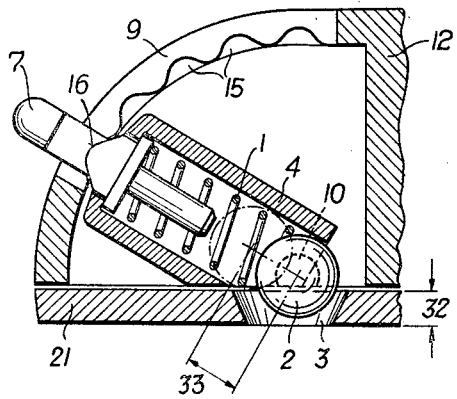
FIG. 4 is a view similar to FIG. 2 showing a different position of adjustment.

To effect a release of the coupling between the members 12 and 21, so that the former may tilt about the axis 31 shown in FIG. 2, it is necessary for the ball 2 to move out of the seat 3. This is of course results in a corresponding axial compression of the biasing spring 1. The distance through which the ball 2 must move to completely leave the seat 3 is illustrated in FIGS. 2 and 4 and identified with reference numeral 32. It will be noted that this distance, that is the length of the path which the ball 2 must traverse in moving in the aforementioned first direction of the seat 3, corresponds to the extent to which the spring 1 must undergo axial compression. In other words, the distance by which the ball 2 must move to completely leave the seat 3, controls the force required for operating of the device in a sense freeing the member 12 for movement relative to the member 21.

If the device is in the position illustrated in FIG. 4, then the ball 2 must obviously be moved upwards in the aforementioned first direction by the distance 32 in order to completely leave the seat 3. In view of the fact that the sleeve member 4 is arranged with its axis inclined to the seat 3, the ball 2 must also move in axial direction of the sleeve member 4 and must thus traverse a composite distance which is considerably greater than the distance 32 by itself. Specifically, the ball 2 must traverse the distance 33 before it can leave the seat 3, and a comparison will readily establish that the distance 33 is significantly greater than the distance 32. Evidently, this will result in stronger axial compression of the biasing spring 1 than if the ball were to move only by the distance 32, and this of course means that the actuating force in this position is greater than if the device were to be one of the other possible positions illustrated in which the sleeve member 4 is not inclined as strongly to the seat 3 as in the position shown in FIG. 4.

Figure 5:
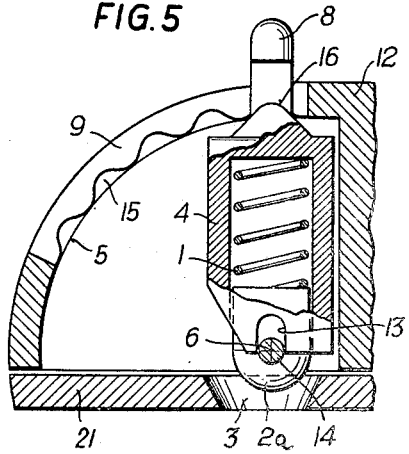
FIG. 5 is a view similar to FIG. 2 illustrating a further embodiment of the invention.

The embodiment illustrated in FIG. 5 differs from FIGS. 1–4 in that the actuating portion 8, which in FIGS. 1–4 is separate from the sleeve 4, is of one-piece construction with the sleeve member 4 in FIG. 5. It could also be simply rigidly connected with the sleeve member 4. In any case, to effect movement of the sleeve member 4 to one of the various positions of adjustment, the actuating portion 8 together with the sleeve member 4 are moved in downward direction until the projections 16 become disengaged from the recesses 15.

It is therefore necessary to provide the lower end of the sleeve member 4 with axially extending slots 13, and transversely extending projections or pins 14 are rigidly secured in the structural member 12 and extend into the slots to guide the sleeve member 4 and also to define the pivot axis 6 for the sleeve member 4. In this embodiment the ball 2 is also replaced by a retaining member 2′ which is configurated in the manner shown in FIG. 5 and has a substantially hemispherically rounded end portion engageable in the seat 3.

Figure 6:
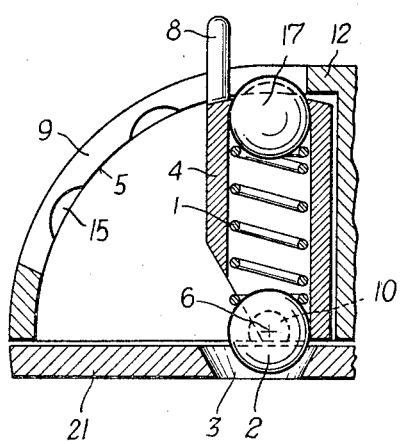
FIG. 6 is a view similar to FIG. 2, but illustrating an additional embodiment of the invention.

The embodiment illustrated in FIG. 6 differs from that of FIGS. 1–4 in that an additional ball 17 is provided at the upper end of the sleeve member 4, that is the end which is located spaced from the ball 2. The ball 17 projects out of the upper open end of the sleeve member 4 in this embodiment and the spring 1 bears upon both of the balls 2 and 17, urging the latter into engagement with the respective recesses 15. In this embodiment the actuating portion 8 is arranged laterally at the sleeve member 4 so as not to interfere with the ball 17.

Figure 7:
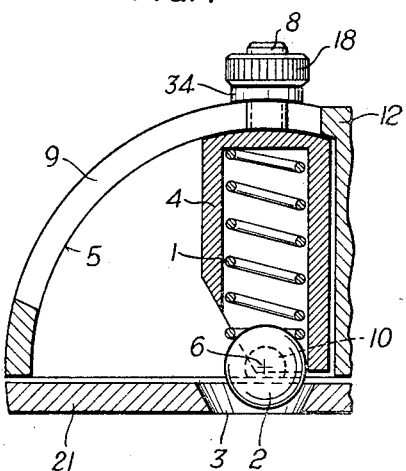
FIG. 7 is a view similar to FIG. 2 illustrating a further embodiment of the invention.

In FIG. 7 the sleeve 4 is provided with a projection 8 serving as an actuating portion and extending outwardly through the slot 9. In this embodiment, however, the projection 8 is externally screw threaded and a setting nut 18 is threaded on to the projection 8, with a washer or similar element 34 surrounding the projection 8 intermediate the wall portion 5 of the member 12 and the nut 18. In this embodiment it will be seen that there are no recesses 15 and that the upper end of the sleeve member 4 is closed. Arresting of the sleeve member 4 in the desired position is effected by screwing the nut down tightly so that the washer 34 tightly and frictionally engages the wall portion 5. Of course, to release the member 4 for pivoting movement it is simply necessary to loosen the nut 18. This construction makes it possible to provide for continuous adjustment of the position of the sleeve member 4, that is the latter can be positioned at will because it is no longer necessary to predetermine the obtainable positions via the recesses 15. In this embodiment it will be particularly advantageous to provide a suitable scale or other indicating means in the region of the slot 9 on the wall portion 5, so that the various positions may be readily selected by reference to such indicating means.

Figure 8:
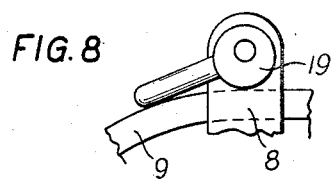
FIG. 8 is a schematic detailed view illustrating a detail of an additional embodiment of the invention.

In the embodiment of FIG. 8 it is shown that the nut 18 may be replaced with a well-known excenter arrangement 19 provided on the actuating portion 8 and operable in the well-known manner of such constructions. This, also, makes possible a continuous variation of the positioning of the sleeve member 4. It should be understood, of course, that in this embodiment the wall portion 5 may be provided with depressions, if desired, into which the excenter 19 can engage.

Figure 9:
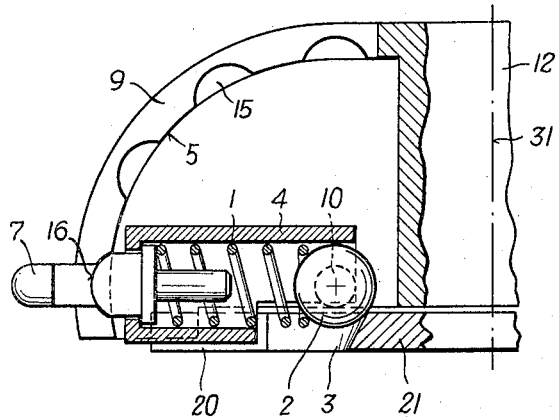
FIG. 9 is a view similar to FIG. 4 but illustrating yet an additional embodiment of the invention.
Figure 10:
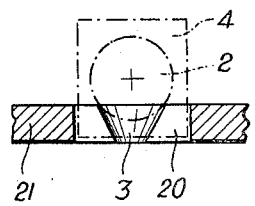
FIG. 10 is a schematic illustration of a detail of the embodiment shown in FIG. 9.

The embodiment illustrated in FIGS. 9 and 10 is somewhat similar to that of FIGS. 1–4. However, in this embodiment of FIGS. 9 and 10 the sleeve member 4, which is advantageously of polygonal cross-sectional outline, may be tilted through 90° to the extreme end position illustrated in FIG. 9. In this end position the sleeve member 4 is itself partly received in a recess 20 of the structural member 21. Of course, the ball 2 cannot under any circumstances move out of the seat 3 in this or an analogous position of adjustment, and the depression or recess 20 is provided only as an additional safeguard to relieve in the illustrated position of FIG. 9 the seat 3 and the ball 2 of stresses. From this it follows that the recess or depression 20 may be eliminated if desired.

FIGS. 11 and 12 show an embodiment of the invention wherein the pivoting axis of the sleeve 4 is offset laterally of the center of the ball 2. The arcuate path defined by the wall portion 5 is concentric with the pivoting axis 6 and in this embodiment turning of the sleeve member 4 to one of the various positions of adjustment effects stronger stressing of the spring 1 for two reasons, namely on the one hand because the distance between the wall portion 5 and the original position of the ball 2 decreases, and on the other hand because the ball 2 is forced by the tilting sleeve member 4 to move slightly towards the left. Furthermore, this movement of the ball 2 changes the distance between the same and the pivoting axis 31 of the member 12, which distance in the initial or rest position of the sleeve member 4 is shown in FIG. 11 and identified with reference numeral 35, whereas the changed distance in the extreme operating position is shown in FIG. 12 and identified with reference numeral 36. This increases the release force so that in this embodiment the released force is increased in three distinct ways. It will be appreciated that it is also possible to so select the pivoting axis 6 for the sleeve member 4 that the distance between the wall portion 5 and the pivoting axis 6 increases in response to movement of the sleeve member 4 from its rest position to its maximum operating position. This will result in a certain compensation for the increased forces if this is desired. Evidently, it is also possible to construct a wall portion 5 so as to define not only a part-circular path, but a path having any desired curvature.

The embodiment of FIG. 13 shows a nut 30 articulately connected with the sleeve member 4. A screw member 23, on the other hand, is articulately connected with the structural member 12 and threaded into the screw 30. By changing the extent to which the screw 23 is threaded into the nut 30, it being understood that the screw 23 can be turned with reference to the structural member 12 but not shifted relatively thereto, the sleeve member 4 is tilted about its pivot axis to its various different positions of adjustment. Because the sleeve member 4 is not readily visually observable in this embodiment, a pin or projection 24 is provided on the sleeve member 4 and the structural member 12 is provided with an arcuate slot 25 in which the pin 24 glides along so as to be visually observable from the exterior.

In the schematically illustrated embodiment of FIG. 14 a lever 26 is connected to the sleeve member 4 with one of its ends, whereas its other end is turnably connected with a nut 27. The latter is threaded onto a screw 28 and turning of the screw 28 causes the nut 27 to move in upward and downward direction, as seen in the drawing. This, in turn, effects a pivoting of the sleeve member 4 about the pivot 6 via the intermediary of the lever 26. To increase the extent to which the sleeve member 4 may be tilted, it is possible to articulately connect a further lever 29 with the nut 27 and to turnably secure the lever 29 at its other end to a suitable support. If the construction is of this type, then turning of the screw 28 not only causes the nut to move upwardly from the position illustrated in FIG. 14, but simultaneously the nut itself will move in the direction of the arrow 37 and this movement will be transmitted to the sleeve member 4. A projection 22 is provided on the sleeve member 4 which, when the latter has been moved to its maximum position of adjustment, will engage into the recess 20 provided in the structural member 21 so as to obtain the type of reinforced arresting position which is also shown in FIGS. 9 and 10.

The embodiment illustrated in FIG. 15 shows the device according to the present invention incorporated in a front boot-engaging member of a ski binding. This illustration is provided for the purpose of clarifying the arrangement and positioning of the novel device and it will be appreciated that the boot-engaging member 12 will, when the detent is released, tilt about the axis 31 relative to the base plate 21 and will free the boot.

In conjunction with the pivotable sleeve member 4 and variations in the inclination of the walls bounding the seat 3, it is possible to predetermine different release forces. Of course, these combinations may cooperate either in a sense effecting addition or subtraction of forces, and by way of example one possible solution as illustrated in FIG. 16 where the walls of the seat 3 are inclined at the left-end side thereof somewhat more strongly so as to oppose a stronger force to the movement of the ball 2, or analogous member, out of the seat 3. It need not be emphasized that other possibilities exist because they will offer themselves readily to those skilled in the art.

Figure 17:
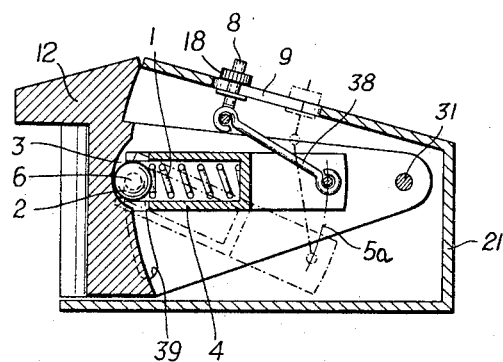
FIG. 17 is a partly sectioned and somewhat diagrammatic view illustrating an embodiment of the invention as incorporated in a heel hold-down of a ski binding.
Figure 18:
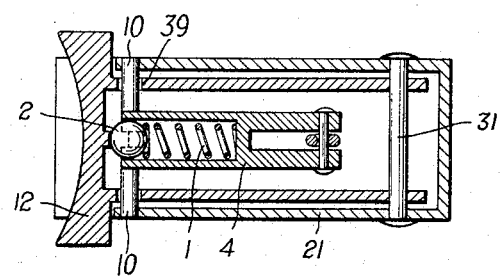
FIG. 18 is a top-plan view of FIG. 17.

FIGS. 17 and 18, finally, illustrate the use of the present invention in a heel holding arrangement of a ski binding for holding the heel of the ski boot. Here, the structural elements 12 is the member holding down the heel of the boot and is turnable about the pivoting axis 31 with reference to the structural element 21. In this instance it is the structural element 21 which is provided with the seat 3 in which the ball 2 guided in the sleeve member 4 is to snap under the influence of the biasing spring 1. The lateral projections 10 on the sleeve member 4 are turnably mounted on the structural element 21, constituting a pivoting axis about which the sleeve member 4 may be turned to obtain the desired angle of inclination thereof. This turning of the sleeve member 4 about the pivoting axis 6 is effected via an actuating portion 8 which is externally screw threaded and carries a nut 18, and which is connected with the sleeve member 4 via a lever 38 which is articulately connected with the actuating portion 8 as well as with that end of the sleeve member 4 which remote from the projections 10. FIG. 17 shows the nut 18, the actuating portion 8, the lever 38 and the sleeve member 4 in a solid line position and in uninclined position which is shown in broken lines, and it will be appreciated that the movement from the solid line position to the broken line position can be effected by loosening the nut 18 and sliding the same, together with the actuating portion 8, in the slot 9 (compare FIG. 17). This causes the sleeve member 4 to move along a path 5a which is concentric with the pivoting axis 6. On the emergency release of the arrangement, for instance if the skier should fall, the structural member 12 pivots upwardly for which purpose slots 39 are provided in the structural member 12 through which the projections 10 of the sleeve member 4 extend.

It will be appreciated that the various embodiments and possibilities of use have been illustrated here only by way of example, and that others are possible and will be obvious to those skilled in the art. Particularly, it will be understood that the invention encompasses, and that the appended claims are intended to protect, all functional or structural reversals, for instance embodiments wherein the sleeve member 4 is immovable whereas the member provided with the seat 3 is adjustable, or a construction wherein the sleeve member 4 is tiltable, that is provided in the immovable structural member whereas the movable structural member is provided with the seat 3 and is tiltable with reference to the sleeve member 4.

It will be understood that each of the elements described above, or two or more together, may also find a useful application in other types of constructions differing from the types described above.

While the invention has been illustrated and described as embodied in a locking arrangement which is particularly suitable for use in safety ski bindings, it is not intended to be limited to the details shown since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A construction of the character described, particularly a detent arrangement for use in ski bindings, comprising in combination, a structural member provided with a seat; detent means, including a retaining member arranged to enter and leave said seat and being movable in a first direction so as to leave said seat, and biasing means acting upon said retaining member in a second direction to thereby urge it into said seat; and carrier means provided for said detent means and being movable between a plurality of positions to thereby change the angle enclosed between said first and second directions, whereby to vary the extent to which said retaining member must move in said second direction in order to be able to move in said first direction by a distance sufficient for said retaining member to leave said seat.

2. A construction as defined in claim; and further comprising an additional structural member connected with and supporting said carrier means for movement of the latter between said plurality of positions.

3. A construction as defined in claim 2, said additional structural member being pivotably movable with reference to said structural member in response to movement of said retaining member in first direction by a distance sufficient for said retaining member to leave said seat.

4. A construction as defined in claim 3, said carrier means being arranged to share the pivoting movements of said additional structural member.

5. A construction as defined in claim 4, said carrier means being movable between said plurality of positions with reference to said additional structural member.

6. A construction as defined in claim 5, said additional structural member comprising wall means defining an arcuate path for movement of said carrier means between said plurality of positions.

7. A construction as defined in claim 6, and further comprising cooperatively engageable arresting means provided on said wall means and said carrier means for arresting said carrier means in respective ones of said positions.

8. A construction as defined in claim 5, said carrier means comprising a sleeve-shaped member having a longitudinal axis and being pivotable between said positions about a pivot axis transverse to said longitudinal axis.

9. A construction as defined in claim 8, said retaining member having a center and said pivot axis intersecting said center.

10. A construction as defined in claim 8, said retaining member having a center and said pivot axis intersecting said retaining member to one side of said center.

11. A construction as defined in claim 7, said wall means being provided with an elongated slot substantially coextensive with said arcuate path; and further comprising an actuating portion provided on said carrier means and extending through said slot accessible exteriorly of said wall means for disengaging said arresting means.

12. A construction as defined in claim 8, said biasing means comprising a biasing spring bearing upon said retaining member and said sleeve-shaped member, and wherein said sleeve-shaped member is displaceable in direction towards said retaining member against the force of said biasing spring.

13. A construction as defined in claim 8, said additional structural member being provided with recess means, and said sleeve-shaped member being provided with transversely extending projections received in said recess means and positioned so as to define said pivot axis.

14. A construction as defined in claim 8, said additional structural member being provided with projections positioned so as to extend along and define said pivot axis, and said sleeve-shaped member being provided with recesses receiving said projections so that said sleeve-shaped member is pivotable about said pivot axis defined by said projections.

15. A construction as defined in claim 14, said recesses being axially extending slots, said biasing means comprising a biasing spring bearing upon said retaining means and said sleeve-shaped member, and wherein said sleeve-shaped member is displaceable in direction towards said retaining member against the force of said biasing spring.

16. A construction as defined in claim 6, said wall means being provided with an elongated slot substantially coextensive with said arcuate path; and further comprising an actuating portion provided on said carrier means and extending through said slot accessible exteriorly of said wall means.

17. A construction as defined in claim 16, said actuating portion being externally screw-threaded; and further comprising nut means threaded onto said actuating portion exteriorly of said wall means and being threadedly movable into engagement with the latter to arrest said actuating portion and thereby said carrier means in the respective position thereof.

18. A construction as defined in claim 16; and further comprising eccentric means associated with said actuating portion exteriorly of said wall means and operative for arresting said actuating portion and thereby said carrier means in the respective position thereof.

19. A construction as defined in claim 8, said sleeve-shaped member being concealed from view; and further comprising visually observable position-indicator means for indicating the respective position of said sleeve-shaped member.

20. A construction as defined in claim 19, said additional structural member being provided with an aperture, and said sleeve-shaped member being provided with an extension projecting into said aperture and operative for indicating in the latter the respective position of said sleeve-shaped member.

21. A construction as defined in claim 8, said sleeve-shaped member comprising a nut member pivotably connected thereto, and said additional structural member comprising a screw member pivotably connected thereto and threaded into said nut member.

22. A construction as defined in claim 8; and further comprising remote control means associated with said sleeve-shaped member and operative for effecting movement of the same to said positions thereof from a location remote from said sleeve-shaped member.

References Cited
UNITED STATES PATENTS 3,172,677  3/1965  Marker.
3,222,079  12/1965  Marker.

FRED C. MATTERN, JR., Primary Examiner

U.S. Cl. X.R.

280—11.35